US010027557B2

(12) United States Patent
Delattre et al.

(10) Patent No.: US 10,027,557 B2
(45) Date of Patent: Jul. 17, 2018

(54) METHOD FOR TRANSMITTING DATA STREAMS THROUGH A TELECOMMUNICATION NETWORK

(71) Applicant: InfoVista SAS, Massy (FR)

(72) Inventors: Michel Delattre, Boulogne Billancourt (FR); François Lecerf, Chaville (FR)

(73) Assignee: INFOVISTA SAS, Massy (FR)

( * ) Notice: Subject to any disclaimer, the term of this patent is extended or adjusted under 35 U.S.C. 154(b) by 54 days.

(21) Appl. No.: 14/917,851

(22) PCT Filed: Sep. 9, 2014

(86) PCT No.: PCT/EP2014/069176
§ 371 (c)(1),
(2) Date: Mar. 9, 2016

(87) PCT Pub. No.: WO2015/032970
PCT Pub. Date: Mar. 12, 2015

(65) Prior Publication Data
US 2016/0226723 A1   Aug. 4, 2016

(30) Foreign Application Priority Data

Sep. 9, 2013  (FR) ...................................... 13 58653

(51) Int. Cl.
*G06F 13/00*     (2006.01)
*H04L 12/24*    (2006.01)
(Continued)

(52) U.S. Cl.
CPC .......... *H04L 41/5003* (2013.01); *H04L 43/08* (2013.01); *H04L 45/04* (2013.01);
(Continued)

(58) Field of Classification Search
CPC ..... H04L 45/04; H04L 67/10; H04L 41/5003; H04L 43/08; H04L 12/2858; H04L 45/302
(Continued)

(56) References Cited

U.S. PATENT DOCUMENTS 7,792,020 B2 *  9/2010  Zhao ................... H04L 12/2878
                                                                  370/228
9,137,264 B2    9/2015  Delattre et al.
(Continued)

OTHER PUBLICATIONS

Marcus Eckert et al., "QoE Management Framework for Internet Services in SDN Enabled Mobile Networks" T. Radio Frequency Identification, Lecture Notes in Computer Science, Aug. 28, 2013.
(Continued)

*Primary Examiner* — Kenneth R Coulter
(74) *Attorney, Agent, or Firm* — Pearne & Gordon LLP (57) ABSTRACT

Provided is a method for controlling exchanges of data streams between at least one source connected to a hybrid wide area telecommunication network via a local area access network and at least one recipient connected to the wide area telecommunication network via a remote access network. The method includes the steps of: setting new transfer rules through the analysis of the streams, dynamically creating at least one additional stream exchange path from the new transfer rules and the access rules in force, applying on the additional path burn-in, securization and optimization mechanisms for the stream transfers between the local area access network and the remote access network, and transferring each new stream to the recipient via the additional path according to the new transfer rules.

5 Claims, 4 Drawing Sheets

(51) Int. Cl.
  *H04L 12/715* (2013.01)
  *H04L 12/26* (2006.01)
  *H04L 29/08* (2006.01)
  *H04L 12/28* (2006.01)
  *H04L 12/725* (2013.01)

(52) U.S. Cl.
  CPC .......... *H04L 67/10* (2013.01); *H04L 12/2858* (2013.01); *H04L 45/302* (2013.01)

(58) Field of Classification Search
  USPC .......................... 709/239, 238, 231, 217–219
  See application file for complete search history.

(56) References Cited

U.S. PATENT DOCUMENTS

2009/0257446 A1* 10/2009 Zhao ................... H04L 12/2878
 370/468
2013/0223226 A1 8/2013 Narayanan et al.
2013/0268995 A1 10/2013 Delattre et al.

OTHER PUBLICATIONS

Andreas Kassler et al., "Towards QoE-driven Multimedia Service Negotiation and Path Optimization with Software Defined Networking", 20th International Conference on Software, Telecommunications and Computer Networks, IEEE, Sep. 11, 2012.
Search Report issued in French Patent Application No. FR 13 58653 dated May 28, 2014.
International Preliminary Report on Patentability issued in Application No. PCT/EP2014/069176 dated May 1, 2016.
International Search Report issued in Application No. PCT/EP2014/069176 dated Dec. 22, 2014.
Written Opinion issued in Application No. PCT/EP2014/069176 dated Dec. 22, 2014.

* cited by examiner

METHOD FOR TRANSMITTING DATA STREAMS THROUGH A TELECOMMUNICATION NETWORK

TECHNICAL FIELD

The present invention lays in the field of telecommunications and more specifically relates to a method for transmitting data streams between a source connected to a wide area telecommunication network via a local area access network and a recipient connected to said wide area telecommunication network via a remote access network, said wide area telecommunication network including at least one control central module for defining transfer parameters of said streams between the source and the recipient.

The invention also relates to a device adapted to implement the method.

The invention also relates to a computer program stored on a recording medium including instructions for implementing the steps of the method according to the invention, when run on a computer.

This method and this device can be implemented whatever the geographical extent of the network, whatever the data rate forwarded by the latter and whatever the number of users of this network.

STATE OF PRIOR ART

In the packet mode telecommunication networks, information is exchanged in groups referred to as packets essentially made of a header containing the information for forwarding the packet in the network and data to be transmitted. Addressing information is inserted in the headers to allow the information streams to be identified by the final applications. Packets are conveyed through the wide area network, and according to this network, take various transmitting and switching means. Information transfer requires the deployment of switching or routing equipment directing the information from a source to a destination through transmitting means and information adaptation functions so as to occupy as few resources as possible and to maintain the transfer characteristics of the streams in spite of the competition of the latter. It also requires routing and adaptation control functions so as to ensure an optimum secure transfer service.

In the first generations of packet networks, the deployed equipment decided to route and schedule emissions of packets, packet by packet, and hop by hop. This approach had the advantage of being reliable and could be easily deployed. Indeed, each device inserted in the network synchronizes with the directly adjacent devices and autonomously applies previously planned transfer rules. The initial service performed was a connection of the equipment without strong requirements about the transfer characteristics of information streams and without a stream differentiation. The devices have an action coordinated by the coherent initial rules calculated during a network planning phase, and the observations are collected to estimate the relevance and the efficiency of the plane. Collection is made at a central point located in a central management system and in charge of correlating all the observations in order to build a comprehensive view of the system. Adjusting phases make it possible to redistribute new rules constituting a new plane in order to upgrade the system as a function of the forecast need and of the results obtained during the previous planes. The central system distributes the operating rules (policies) by control streams towards the network elements in charge of their application. The latter generate events and give a read access to statuses which are collected by the central system in management streams. The resources of the network are therefore shared between the information streams which pass through the network and the control and management streams which contribute to the proper functioning of the transport service of the network.

The current telecommunication networks are facing, on the one hand, a strong convergence where specialization was replaced by a seamless information transport service, which is more flexible, more efficient and less expensive, and on the other hand, to the virtualization of the information system where consolidation and rationalization of the resources of the information system introduce a strong mobility of the information producers and consumers insofar as the applications are no longer linked to physical servers by an installation operation, but are dynamically allocated to servers by an orchestrator. This evolution introduces an extreme variability of the transfer types that these networks have to process as well as an extreme variability of the exchange topologies. It then becomes essential to adapt the information transfer stream by stream, to coordinate these adaptations so as to have again an overall predictable behaviour for each application and dynamically arbitrate the competition of applications as a function of operational objectives. To ensure these functions, additional resource management, optimization and filtering devices have been added to the routing devices to set up complex mechanisms of stream recognition (Deep Packet Inspection, etc.), performance measurements, optimization of transfer efficiency, and matching of the transfer means and of demands according to a comprehensive discipline. These additional devices are arranged on the data paths and their efficiency is all the greater that the covered network surface is great and that the area is equipped.

Recently, the Software Defined Network concept introduced a new approach where the control plane is totally disconnected from the data plane. This disconnection enables the control plane to be deployed on greater capacity pooled platforms making coherent decisions for a set of switching or routing equipment. The most advanced communication protocol between a logically centralized control plane (one or more controllers) and the data plane (network switches) is OpenFlow. It is standardized by the "Open Networking Foundation" (ONF) and implemented by numerous equipment manufacturers. Software-Defined Networking is a key concept to bridge the dynamic management of network resources on the one side and the connectivity demand and Quality of Service (QoS) demand of cloud computing-type applications. Application of these new approaches to business wide area networks where applications are distributed on geographically distant sites connected through several Virtual Private Networks (VPN) which preserve the partitioning and logical security of a local area network comes up against the following problems:

the global network is divided into several autonomous routing domains administered by distinct entities, typically the Local Area Network (LAN) of the company and several Wide Area Networks (WAN) of telecommunication operators, this division impeding a totally centralized or homogeneous control plane;

the overlay deployment, for example of a centralized control plane for all the local area networks of a company distributed around a wide area network rises a reactivity problem, insofar as the centralized controller can no longer maintain coherent statuses at both ends of a wide area network at the rate of the streams;

the company network generally relies on a plurality of wide area networks to interconnect the sites in order to reach a proper availability of the services; these wide area networks, as seen from the company local area network, constitute independent paths for the information streams. These streams take one of these paths independently of their contents and their Quality of Service (QoS) and/or of Experience (QoE) requirements needed for the different streams;

the elasticity of the communications services makes the configuration operations of the network difficult, it is therefore essential to set up auto-configuration and auto-learning procedures;

some wide area networks are not limited to a simple generic service of transport independent of the stream content, the company can for example rely on the services of a CDN (Content Delivery Network) network for its Internet streams, or even, on the services of a "Cloud-based" operator which can include stream optimizations. These optimizations no longer enable a route to be simply characterized by basic metrics such as the information packet delay.

The object of the invention is to overcome the above-described prior art drawbacks.

DISCLOSURE OF THE INVENTION

This object is reached by means of a method for controlling exchanges of data streams between at least one source connected to a wide area telecommunication network via a local area access network and at least one recipient connected to said wide area telecommunication network via a remote access network.

The method according to the invention includes the following steps:

analysing the exchanged streams to determine the rules in force for accessing the wide area network as well as the QoE objectives related to these streams;

defining new rules of stream transfer as a function of the analysis result;

transmitting to the remote access network the new rules of stream transfer;

dynamically creating at least one additional stream exchange path from transfer means reconfigured according to the new transfer rules and the access rules in force;

applying to said additional stream exchange path burn-in, securization and optimization mechanisms for the stream transfers between the local area access network and the remote access network parameterized according to the new transfer rules;

and, transferring the streams to the recipient according to the new transfer rules by using at least one additional path.

Advantageously, this method includes a further step of continuously collecting measured transfer characteristics of the streams during the transfer of these streams to the recipient.

The method according to the invention further includes the following steps:

defining the transfer function of each stream exchanged between the source and the recipient;

adjusting the transfer function of each stream as a function of the new transfer rules to meet predefined QoE objectives;

coordinating all the adjustments of the transfer functions of all the streams so as to optimize the use of the available network resources.

The method according to the invention further includes a step of collecting transfer characteristics of the control stream for coordinating the exchanges between the local area access network and the remote access network so as to continuously supervise the transfer means of the streams.

This step of supervising includes the following functions:

continuously measuring the QoEs obtained for each stream;

continuously assessing the deviation between predefined QoE objectives and the measured QoEs;

adapting the new transfer rules as a function of the statuses of the transfer means so as to reduce the deviation between the predefined QoE objectives and the measured QoEs and to bring the system to a balance maximizing the QoE.

The method according to the invention is implemented by means of a device of distributed control of data stream exchanges between at least one source connected to a wide area telecommunication network via a local area access network and at least one recipient connected to said wide area telecommunication network via a remote access network including a central module CM for setting a comprehensive policy defining the transfer rules of the streams between the source and the recipient, a module M1 for identifying the information streams and analysing these streams in order to determine the rules in force for accessing the wide area network, a module M2 for forwarding the streams between a local area access network and a remote access network according to the transfer rules adapted for each stream, and for dynamically creating at least one additional stream exchange path from the new transfer rules and the rules in force for accessing the local network, a module M3 for continuously measuring the QoEs obtained on the streams at the output of the module M2, a module M4 for continuously supervising the transfer means of the streams identified by the module M1, a module M5 which continuously receives QoE indicators measured by the module M3 and supervision reports of the transfer means set by the module M4, continuously assesses the deviation between the QoE objectives and the observed results and defines new transfer rules as a function of the statuses of the transfer means so as to reduce the deviation between the QoE objectives and the observed results and to bring the system to a balance maximizing the QoE.

The module M2 further includes means for applying on said additional path mechanisms of burn in, securization and optimization for stream transfers, and means for routing each new stream on the additional path.

The method according to the invention applies whatever the rules for accessing the wide area networks describing the rights and the methods for accessing these networks. By access method, it is meant the means for reaching the wide area networks and the configuration parameters of these means.

These access methods apply for example to configure:

a local area and remote access network having one or more connection points to one or more operators' wide area networks, an access network interconnected by operators' wide area networks having behaviours differentiated according to a marking in the forwarded packets (for example: DSCP field of DiffSery or CoS 802.1p);

an access network interconnected at the overlay by encapsulating each packet in order to address the middleboxes of access networks;

an access network interconnected via mechanisms of burn-in, securization and optimization for stream transfers between the local area network and the remote network and located either in an area of an operator's wide area network, or in the access networks themselves;

an access network accessing the CDN (Content Delivery Network) services to best forward the information content.

The method is adapted to the management of multiple transfer rules, such as for example:

selecting in the local area access network one of the possible rules for accessing the wide area network;

selecting one of the possible rules in force for accessing the wide area network in the remote access network;

chaining burn in, securization and optimization services for stream transfers between the local area access network and the remote access network;

parametering burn-in, securization and optimization mechanisms for stream transfers between the local area access network and the remote access network.

These transfer rules modify the transfer functions that the information streams undergo when they are forwarded between the local area access network and the remote access network, and which is expressed by evaluation criteria such as:

delay, jitter, losses generally referred to as quality of service (QoS) performance levels;

proper forwarding probability, interception or corruption probability;

response time, overall perception of the service, generally referred to as Quality of Experience (QoE) performance levels.

The method enables a plurality of stream exchange paths to be dynamically created. This is obtained for example by:

modifying the local address identifying the middlebox in charge of the connection with the wide area network (middlebox, router, switch) into a local area access network, diverting, in a transparent way for the users, the streams towards means for marking or encapsulating the packets of exchanged streams;

remotely controlling the transfer means located on the stream path in the local area and remote access networks in order to mark or encapsulate the packets of exchanged streams;

creating new means for processing the streams by orchestrating the virtual machines providing these new means.

These actions are obtained by reconfiguring the transfer means used for forwarding streams such as a router, a switch, optimization, burn-in and securization means.

BRIEF DESCRIPTION OF THE DRAWINGS

Further features and advantages of the invention will become more apparent from the following description, taken by way of non-limiting example, with reference to the appended figures in which.

DETAIL DISCLOSURE OF PARTICULAR EMBODIMENTS

Figure 1:
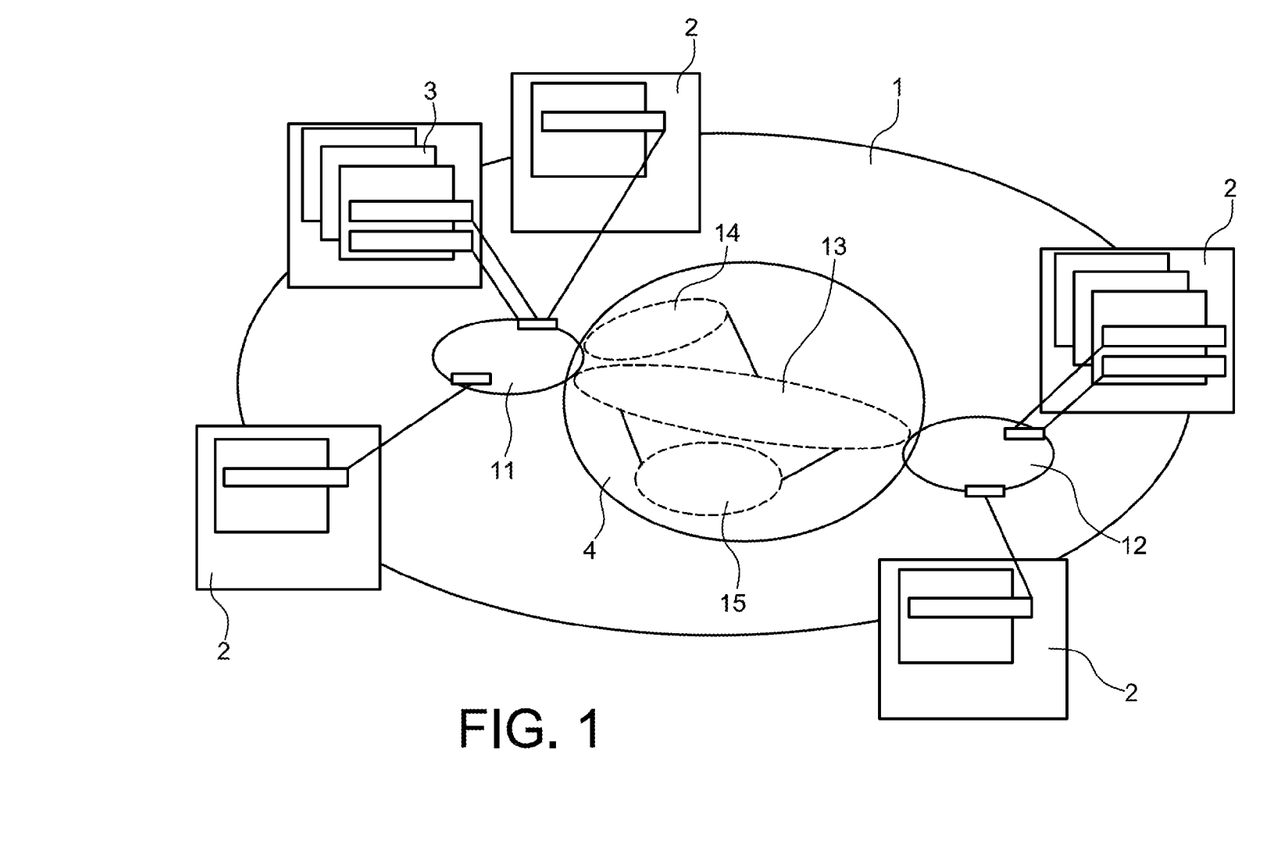
FIG. 1 depicts a general diagram of an information system in which the method according to the invention is implemented.

The method of the invention will be described implemented in an information system distributed 1 around a packet mode network such as schematically illustrated by FIG. 1 in which participants 3 (machines or individuals) of a network-based application involving mobile and fixed terminals or physical or virtual servers (for example Cloud Computing servers) exchange data streams in packet mode. These applications can be, for example, multimedia communication applications such as telephony, videotelephony, videoconferencing, multimedia distribution applications such as video-on-demand, broadcasts, content syndications, consultation applications such as directories, interactive network services, information sharing applications such as peer-to-peer exchanges, distributed database, and more generally, computer applications the elements of which are executed on remote machines, and synchronize and exchange information through the network.

The participants 3 (machines or individuals) of a network-based application depicted in FIG. 1 act as information consumers and producers. These roles can change through the life of an application, for example during a session. These participants connect to the network at geographical or administrative points and they make up a whole as seen from the network referred to as User: 2.5. A User can be an agency, a company, or a mobile individual.

The transit network 4 represents a transport capacity strongly shared between a multitude of users 2.5 and/or private networks. The characteristic of this transport capacity remains stable as seen from a user in spite of the variability of its own information consumption or production that the user may not explicitly report to the network manager by a subscription change or a login/logout.

Access networks 11, 12 enable the participants 3 to connect to transit wide area networks 13, 14 and 15 to exchange data streams.

The multiplicity of these transit wide area networks 13, 14, and 15 enhances the availability of the exchange services and enables means adapted to the information streams demands to be used. For example, streams can be passband-intensive but undemanding in terms of delay; others rather serve response time sensitive applications. This multiplicity provides the transit network 4 with a hybrid capacity advantageously used by the method according to the invention.

FIG. 1 shows several hybrid transit networks 4 as seen from the access networks 11, 12. The access network 11 for a user 2 depicts a case of multiconnection to several operators' networks 13, 14. The method according to the invention enables stream exchanges between the access networks 11, 12, via the wide area network 14, although the access network 12 has no direct connection with this wide area network 14. The wide area network 15 can be a case of hybrid CDN network or an overlay network providing optimized services for each customer company (referred as a multitenant capacity) the participants of which are geographically distributed.

The access networks 11, 12 have limited transport capacities with the transit wide area network. As a result, the information streams exchanged between the participants 3 undergo strong distortions due to the fact that the connection rates of the access networks 11, 12 are much lower than those of the transmission rates of the terminal physical elements, or due to competitions between users 2.5 served by an access network. These strong distortions appear during so-called bottlenecked time periods. A coherent discipline between the participants 3 enables these bottlenecks to be avoided.

The method according to the invention relies on a device of distributed control of stream exchanges through the wide area telecommunication network within the information system 1 including modules arranged closest to means for accessing the wide area network so as to master the transfer function of a stream between the consumers' access and the producers' access. These modules are able to recognize and analyse the information streams exchanged between the different participants 3 geographically distributed in order to master the transfer function of each stream and to coordinate all the transfer functions to obtain the optimum efficiency and the respect of comprehensive objectives of performances and security.

The distributed organization of the control device makes it possible to master the transfer functions of a large number of streams exchanged by the information consumers and producers whatever the geographical extent of the network, whatever the rate forwarded by the latter and whatever the number of users.

These transfer functions are characterized by:
rights,
objectives,
performances,
consumed resources.

Consumed resources are essentially passband on the transfer means but also relate to the processing and temporary storage capacities.

Performances are essentially the performances (QoE) perceived by the consumers for an application, that is the indicators which represent the consumers' capacity to use the transferred information productively. For applications performing for example customer-server interactions, a representative indicator is the transaction delay characterized by the waiting time. More generally for applications distributed around packet-mode telecommunication networks, the indicators can be the absolute packet transfer delay, the jitter of these packets, the packet loss rate or a transfer rate.

The objectives are all the parameters which enable the competition of streams to be arbitrated. This competition of streams requires a sharing of available resources and therefore restricts the consumed resources of each transfer function which deteriorates the individual performances. The objectives enable each transfer function to be adjusted to bring it in an operation range where all the transfer functions best meet their objectives.

The rights are all the parameters which make it possible to ensure the stream conformity to a security policy.

Figure 2:
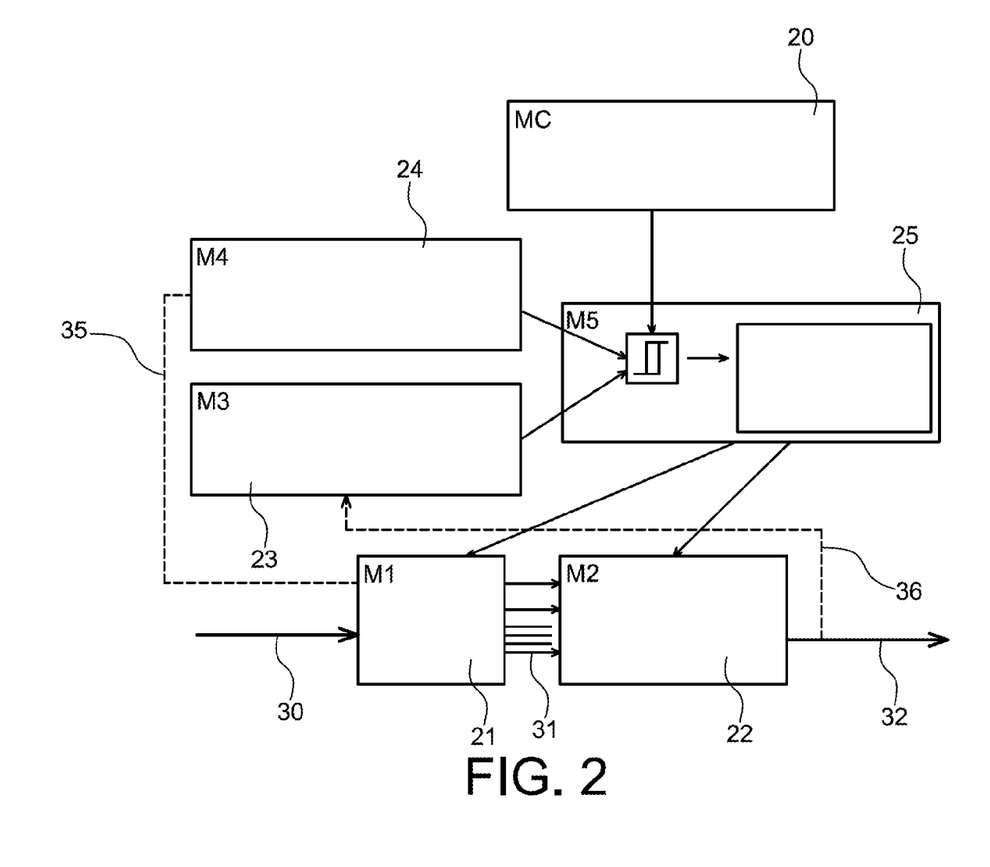
FIG. 2 is a block diagram illustrating the interactions of the modules enabling the method according to the invention to be implemented.

FIG. 2 schematically illustrates the modules of the distributed control device and their interaction upon implementing the method.

This control device includes:
A central module CM (reference number 20) for setting a comprehensive policy defining the transfer rules of the streams between a source connected to the wide area network via a local area access network and a recipient connected to said wide area network via a remote access network, a module M1 (reference number 21) for identifying information streams, a module M2 (reference number 22) for applying to the streams 30 routing and optimization operations, a module M3 (reference number 23) for measuring the QoEs (Quality of Experience) obtained on each stream 32, a module M4 (reference number 24) for supervising the transfer means, a module M5 (reference number 25) for assessing the deviation between QoE objectives and observed results and for supplying the transfer rules to the module M2 so as to reduce the assessed deviation and bring the system to a balance maximizing the QoE.

In operation, the central module CM (reference number 20) introduces in the system the QoE objectives and the performance maximization policy, the module M1 21 identifies the information streams emitted by an information producer and analyses these streams to determine the rules in force for accessing the wide area network.

To do so, the module M1 21:
uses DPI (Deep Packet Inspection) mechanisms,
discovers the connection capacities to the wide area network by analysing for example the MAC local addresses,
discovers the possible actions to the remote access network by inserting, for example, control data in the information streams so as to maintain a table associating the stream recipient—the possible actions.

The module M2 22 performs the routing and optimization operations by conforming to transfer rules. In particular, it performs marking, encapsulation and routing operations at the edge of transit wide area networks, as schematically illustrated by FIG. 2. These operations make it possible to define additional paths and to apply on said additional path mechanisms of burn-in, securization and optimization for stream transfers (stream compression, acceleration, restitution, conditioning, passband adjustment) between the local area access network and the remote access network. It transfers each new stream to the recipient via the additional path according to the new transfer rules.

The module M3 23 continuously measures the stream QoEs perceived at the output of the module M2. This module M3 23 is, for example, adapted to continuously observe the information arrival times of the streams 30 and 32 and to deduce, by correlation, the QoS and QoE performance levels for each of the identified streams.

The module M4 24 supervises the transfer means. The latter comprise the network transmission means and the adaptation and transformation means such as burn-in, securization and optimization of the streams. It is informed by the module M1 21 of the possible actions to the remote access network by status messages 35. When the stream can be controlled in a coordinated way both in the local area access network and the remote access network, it uses the control streams used for coordination to carry out this supervision.

The module M5 continuously receives the QoE indicators and the supervision reports from the transfer means, continuously assesses the deviation between the QoE objectives and the observed results and decides to adjust the module M2 as a function of the statuses of the transfer means so as to reduce the deviation and bring the system to a balance maximizing the QoE.

Figure 3:
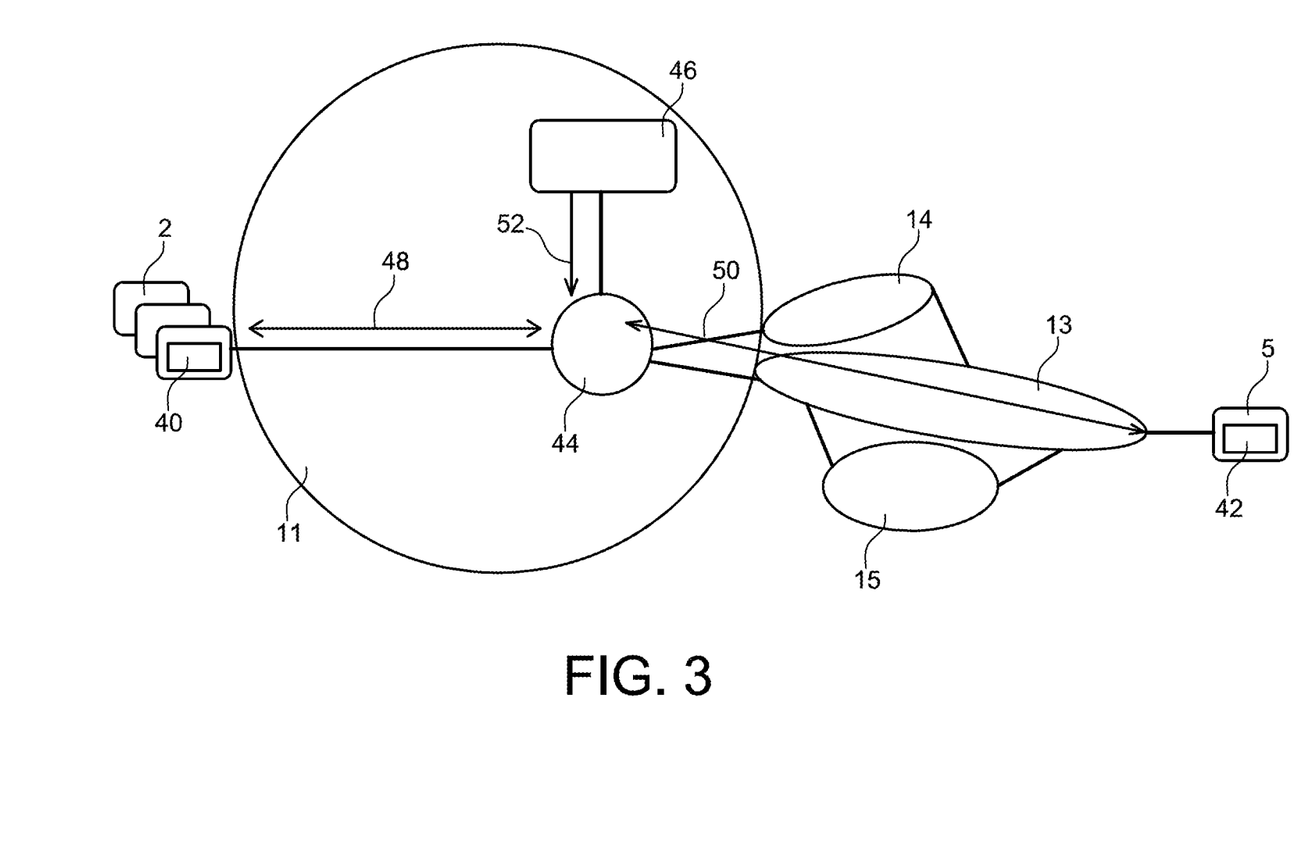
FIG. 3 schematically illustrates an example implementation of the method according to the invention.

FIG. 3 schematically illustrates an example implementation of the method according to the invention in which a computer device 40 of an information Producer of a User site 2 exchanges data streams with a computer device 42 of an information Consumer of a User site 5. The exchanged streams are diverted by a switching element 44 towards a control module 46. The latter includes an M2 type module able to apply, to the diverted streams, a chain of functions such as the stream security, compression, acceleration, conditioning, the pass band adjustment. These functions are chained stream by stream. By way of example, the switching element 44 can be a switch according to the SDN (Software-defined Network) architecture having a control interface 52 based on the OpenFlow specifications. It is to be noted that the control module 46 is dynamically inserted or removed on the data stream path.

Thus, an information stream 48 exchanged with the remote computer device 42 on the wide area network 11 will be transformed into an information stream 50 and forwarded on the wide area network 13 and, possibly, by the wide area network 14 or the wide area network 15.

Figure 4:
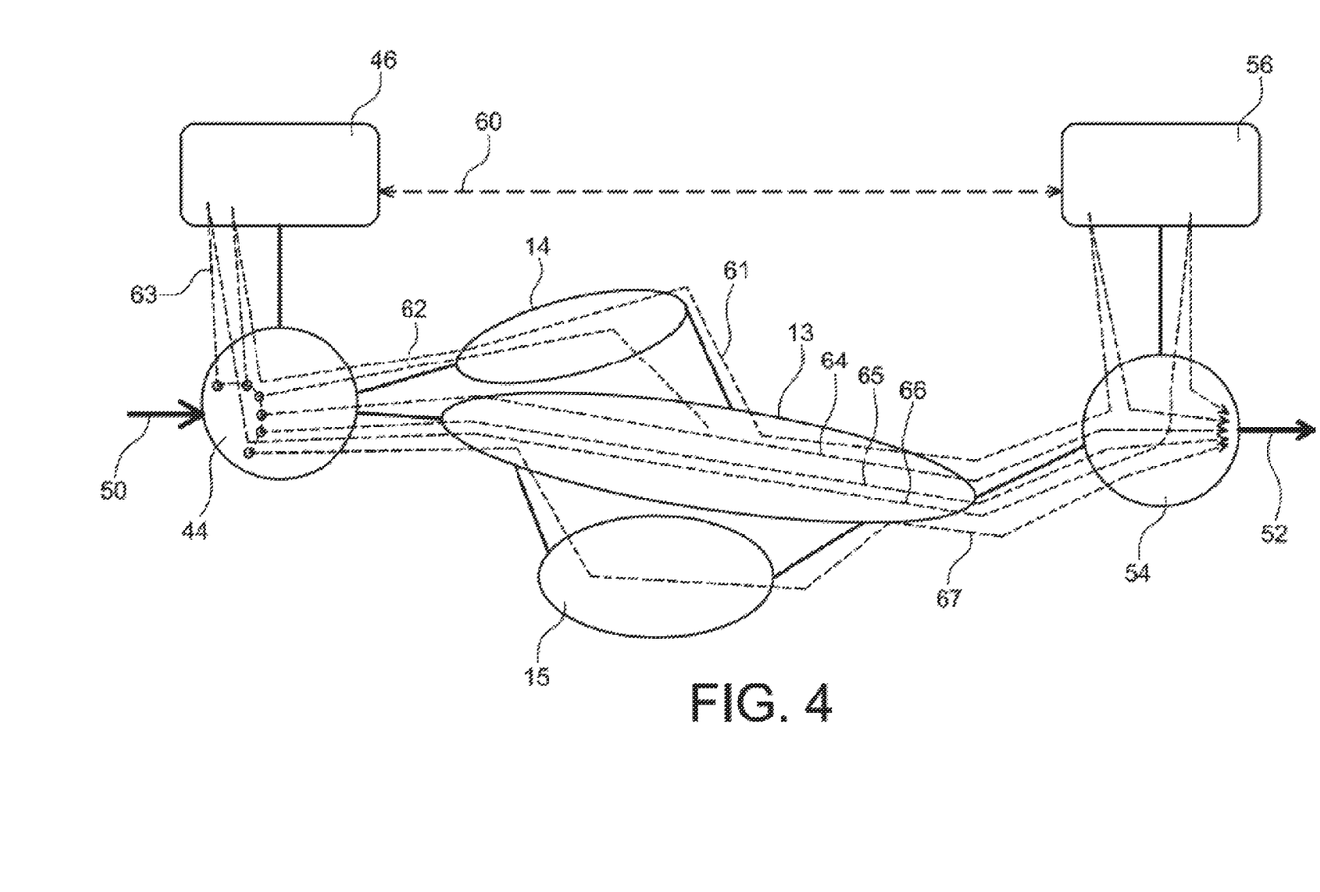
FIG. 4 schematically illustrates a preferred example implementation of the method according to the invention between two sites exchanging data streams.

FIG. 4 schematically illustrates a preferred example implementation of the method.

With reference to FIG. 4, a switching element 44 driven by the control module 46 distributes the information streams 50 on the access paths 61, 62, 63, 64, 65, 66 and 67 to the remote site. The latter includes a switching element 54 which serves the stream recipients 52.

The access path 64 is the default access path. Without the method and the device of the invention, the switching elements of the local area access network route the streams towards a remote access network via the transit network 13 (refer to FIG. 3).

The access path 65 corresponds to a marking of the streams carried out by the switching element 44 at the request of the control module 46 to differentiate the services in the transit network 13. If the control module 46 discovers that the streams can be controlled by another control module 56 with which it can exchange control information 60, the access path 65 is then dynamically created to improve the transfer of certain streams.

The control modules 46 and 56 supervise the service of the transit network 13 by QoE-oriented continuous measurements, that is end-to-end measurements stream by stream. The control module 46 saves the use of this new access path for the streams requiring this improved service.

The access path 66 corresponds to a stream encapsulation in a tunnel linking the switching element 44 and the switching element 54 so as, for example, to extend a business private network over a wide area network open to all such as Internet. The streams will benefit from a chain of services such as stream securization and optimization adapted to the business private network. These services require a coordination between both switching elements 44 and 54. The information exchanged 60 between the control modules 46 and 56 ensures this coordination. Both control modules 46 and 56 supervise the transfer by QoE-oriented continuous measurements that is end-to-end measurements stream by stream so as to use at best the resources necessary for this chain of services.

The access path 67 corresponds to a stream encapsulation in a tunnel linking the switching element 44 to a network equipment 15 (transit network 3). In this case, the company can delegate the optimization processings carried out on the access path 66 to the operator of the transit network 3. Both control modules 46 and 56 will supervise this service of the transit network 3 by QoE-oriented continuous measurements that is, end-to-end measurements stream by stream.

The control module 46 saves the use of this new access path for the streams requiring this optimized service.

The access path 61 corresponds to a stream encapsulation in a tunnel linking the switching element 44 to the switching element 54 taking the transit network 14 so as, for example, to improve the availability of the service by having an alternative to the transit network 13. An example is a site connected to the wide area network by different technological means which can be wired and wireless (4G network, SATCOM, etc.) or by means operated by different operators. Both control modules 44 and 54 supervise the transfers by QoE oriented continuous measurements, that is end-to-end measurements stream by stream so as to distribute at best the streams on the transit networks. The control module 56 takes advantage of this tunnel to distribute its own local streams although the switching element 54 and this control module 56 do not have a direct access to the transit network 14.

The access path 62 corresponds to a simple local routing between the transit network 13 and the transit network 14. This routing does not require encapsulation and thus enables individual streams to be processed by the transit network 14.

Both control modules 46 and 56 supervise the transfers by QoE-oriented continuous measurements and the control module 56 will know the route taken by a stream by exchanging an information stream 60 with the control module 46.

The exchanged information stream 60 can also benefit from the multiplicity of access paths although it forms only one stream from the control module 46 to the control module 56.

An MPTCP (multipath TCP of IETF RFC 6182 and 6824) technique enables these exchanges to be dynamically distributed of a several connections. The advantage obtained is:
monitoring and characterizing the access paths even in the absence of "users" information streams routed on these access paths,
a load, induced by the information stream 60, which hardly depends on the number of access paths dynamically created.

What is claimed is:

1. A method for controlling exchanges of data streams between at least one source connected to a wide area telecommunication network (4) via a local area access network (40, 44) and at least one recipient connected to said wide area telecommunication network (4) via a remote access network (42, 54), including the following steps:
analysing the exchanged streams to determine rules in force for accessing the wide area telecommunication network as well as QoE objectives related to the exchanged streams;
defining new rules of stream transfer as a function of the analysis result;
transmitting to the remote access network the new rules of stream transfer;
dynamically creating at least one additional stream exchange path from transfer means reconfigured according to the new rules of stream transfer and the access rules in force;
applying to said additional stream exchange path burn-in, securization and optimization mechanisms for the stream transfers between the local area access network and the remote access network;
and,
transferring the streams to the recipient according to the new rules of stream transfer by using at least one additional path, the method being characterized in that it further includes the following steps:
continuously collecting measured transfer characteristics of the streams during the transfer of said streams, defining a transfer function of each exchanged stream between the source and the recipient;

adjusting the transfer function of each stream as a function of the new rules of stream transfer to meet predefined QoE objectives;

coordinating all the adjustments of transfer functions of all streams so as to optimize the use of the available network resources;

and continuously supervising the transfer means of the streams.

2. The method according to claim 1, wherein supervising the transfer mean is carried out by collecting transfer characteristics of the streams including control streams introduced to coordinate the exchanges between the local area access network and the remote access network.

3. The method according to claim 2, further including the following steps:

continuously measuring the QoE obtained for each stream;

continuously assessing a deviation between predetermined QoE objectives and the measured QoEs, adapting the new transfer rules as a function of the statuses of the transfer means so as to reduce the deviation between the predetermined QoE objectives and the measured QoEs and to bring the system to a balance maximizing the QoE.

4. A computer program stored on a recording medium including instructions for implementing the steps of the method according to claim 1 when run on a computer.

5. A device of distributed control of data stream exchanges between at least one source connected to a wide area telecommunication network via a local area access network and at least one recipient connected to said wide area telecommunication network via a remote access network including a central module CM (20) for setting a comprehensive policy defining transfer rules of streams between the source and the recipient, a module M1 (21) for identifying the information streams and analysing these streams in order to determine rules in force for accessing the wide area network, a module M2 (22) for forwarding the streams between a local area access network and a remote access network according to the transfer rules adapted for each stream, and for dynamically creating at least one additional stream exchange path from the new transfer rules, a module M3 (23) for continuously measuring the QoEs obtained on the streams at the output of the module M2, a module M4 (24) for continuously supervising the transfer means of the streams identified by the module M1, a module M5 (25) which continuously receives QoE indicators measured by the module M3 and supervision reports of the transfer means set by the module M4, continuously assesses the deviation between the QoE objectives and the observed results and defines the new transfer rules as a function of the statuses of the transfer means so as to reduce the assessed deviation and to bring the system to a balance maximizing the QoE, means for applying on said additional path burn-in, securization and optimization mechanisms for the stream transfers, and means for routing each new stream on the additional path, characterized in that it further includes means for continuously collecting measured transfer characteristics of the streams during the transfer of said streams, and means for continuously supervising the transfer means of the streams.

* * * * *

UNITED STATES PATENT AND TRADEMARK OFFICE
CERTIFICATE OF CORRECTION

PATENT NO. : 10,027,557 B2
APPLICATION NO. : 14/917851
DATED : July 17, 2018
INVENTOR(S) : Michel Delattre et al.

It is certified that error appears in the above-identified patent and that said Letters Patent is hereby corrected as shown below:

In the Specification

Column 4 Line 65, "DiffSery" should be --DiffServ--.

Signed and Sealed this
Second Day of April, 2019

Andrei Iancu
*Director of the United States Patent and Trademark Office*